United States Patent
Chhabra et al.

(10) Patent No.: US 9,930,048 B2
(45) Date of Patent: Mar. 27, 2018

(54) CUSTOMER IDENTIFICATION FOR SEAMLESS WIRELESS-NETWORK ACCESS

(71) Applicant: Apple Inc., Cupertino, CA (US)

(72) Inventors: Kapil Chhabra, Milpitas, CA (US);
Artiom Shamis, Los Gatos, CA (US);
Maziar Brumand, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 14/502,221

(22) Filed: Sep. 30, 2014

(65) Prior Publication Data

US 2015/0223070 A1    Aug. 6, 2015

Related U.S. Application Data

(60) Provisional application No. 61/936,148, filed on Feb. 5, 2014.

(51) Int. Cl.
*H04L 29/06* (2006.01)
*H04W 12/08* (2009.01)
*H04W 12/06* (2009.01)
*H04W 4/02* (2018.01)

(52) U.S. Cl.
CPC ............ *H04L 63/107* (2013.01); *H04L 63/08* (2013.01); *H04L 63/0892* (2013.01); *H04W 12/08* (2013.01); *H04L 63/0876* (2013.01); *H04W 4/021* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,346,924 B1* | 1/2013 | Bucher | H04L 12/5695 707/781 |
| 2010/0290424 A1* | 11/2010 | Collingrige | H04L 12/5692 370/329 |
| 2012/0030737 A1* | 2/2012 | Pagan | G06F 21/44 726/5 |

(Continued)

*Primary Examiner* — Hadi Armouche
*Assistant Examiner* — Andrew Steinle
(74) *Attorney, Agent, or Firm* — Sterne, Kessler, Goldstein & Fox P.L.L.C.

(57) ABSTRACT

An electronic device connects to a network associated with a service provider via a router at a home location. During a time interval, the electronic device provides information specifying a network address of the router to an authentication computer when the electronic device is connected to a network. The authentication computer uses the received information to determine a connection pattern of the electronic device. Moreover, the authentication computer identifies that the electronic device is at the home location based on the connection pattern. Then, the authentication computer provides, to an accounting computer associated with the service provider, a request to allow the electronic device to access a wireless network associated with the service provider at a remote location (which is other than the home location). Furthermore, the authentication computer communicates network information to the electronic device, which allows the electronic device to access the wireless network without providing authentication information.

20 Claims, 6 Drawing Sheets

(56) References Cited

U.S. PATENT DOCUMENTS

| | | | |
|---|---|---|---|
| 2013/0247164 A1* | 9/2013 | Hoggan | H04W 12/06 726/8 |
| 2014/0379911 A1* | 12/2014 | Fayssal | H04L 63/107 709/225 |
| 2015/0103678 A1* | 4/2015 | Fisbein | H04W 12/06 370/252 |

* cited by examiner

CUSTOMER IDENTIFICATION FOR SEAMLESS WIRELESS-NETWORK ACCESS

CROSS-REFERENCE TO RELATED APPLICATION

This application claims priority under 35 U.S.C. § 119(e) to U.S. Provisional Application Ser. No. 61/936,148, entitled "Customer Identification for Seamless Wireless-Network Access," by Kapil Chhabra and Artiom Shamis, filed on Feb. 5, 2014, the contents of which are herein incorporated by reference.

BACKGROUND

Field

The described embodiments relate generally to wireless electronic devices, and more specifically to techniques for facilitating access to a wireless network associated with a service provider by identifying an electronic device of a customer of a service provider, and providing authentication information to the electronic device before the electronic device attempts to connect to the wireless network.

Related Art

Many modern electronic devices typically include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface (such as a near-field-communication interface).

While such wireless communication is increasingly popular, accessing a wireless network is often a cumbersome process. For example, a user of an electronic device may need to: access a list of available wireless networks; select one of the wireless networks; and provide authentication information (such as a username, an account identifier and/or a password). However, it is often difficult for users to remember the authentication information. This can make it difficult for the users to access the wireless network, which is frustrating to the users.

Hence, there is a need for a technique to facilitate access to a wireless network by an electronic device.

SUMMARY

The described embodiments relate to an electronic device (such as a cellular telephone) that includes: an antenna; an interface circuit that wirelessly communicates, via a router at a home location, with a network associated with a service provider and an authentication computer; a processor; and memory that stores a program module that is executed by the processor. During operation, the electronic device provides, during a time interval, information specifying a network address of the router to the authentication computer when the electronic device is connected to the network. Subsequently, the electronic device receives, from the authentication computer, network information that allows the electronic device to access a wireless network associated with the service provider at a remote location that is different from the home location. The network information eliminates a need for the electronic device to provide authentication information (such as a password associated with an account with the service provider) when accessing the wireless network.

Note that the information may include the network address. Alternatively, the information may allow the authentication computer to determine the network address.

Moreover, the network information may include a unique identifier of the wireless network (such as a Service Set Identifier). After receiving the network information, the electronic device may add the identifier to a list of known wireless networks.

Another embodiment provides the authentication computer. The authentication computer includes: a network interface that communicates, via the network, with an accounting computer associated the service provider of the network, and that communicates, via the network and the router at the home location, with the electronic device; a processor; and memory that stores a program module that is executed by the processor. During operation, the authentication computer receives, during the time interval, information specifying the network address of the router when the electronic device is connected to the network. Then, the authentication computer determines a connection pattern of the electronic device based on the received information. Moreover, the authentication computer identifies that the electronic device is at the home location based on the connection pattern. Next, the authentication computer provides, to the accounting computer, a request to allow the electronic device to access the wireless network associated with the service provider at the remote location that is different from the home location. Furthermore, the authentication computer communicates, to the electronic device, the network information, where the network information allows the electronic device to access the wireless network.

In some embodiments, after receiving the information, the authentication computer: requests the network address based on the information; and receives the network address. For example, the authentication computer may access a web page, such as 'WhatIsMyIPAddress.com.'

Moreover, the connection pattern may include: days when the electronic device is connected to the network, times when the electronic device is connected to the network, and durations of the connections to the network at different days and times. For example, when the electronic device is connected to the network via the router (i.e., at the home location), the connection pattern may include: multiple days of the weeks, nights, and durations longer than two hours.

Furthermore, the request may include: a unique identifier of the electronic device (such as a media access control address), the network address, and an expiration date of the access.

Additionally, the network information may eliminate the need for the electronic device to provide authentication information when accessing the wireless network.

Note that the authentication computer may facilitate access by additional electronic devices to the wireless network. In particular, the electronic device may be associated with the account with the service provider, and the additional electronic devices may also be associated with this account. The authentication computer may facilitate the access by providing the authentication information to the additional electronic devices. This may allow the additional electronic devices to access the wireless network, even though these additional electronic devices may not have connected to the network via the router at the home location.

In some embodiments, at least some of the operations performed by the authentication computer in the preceding discussion are performed by the electronic device. In particular, the electronic device may monitor, during the time interval, the connection pattern when the electronic device is connected to the network associated with the service provider via the router at the home location. Moreover, the electronic device may determine that the electronic device is at the home location based on the connection pattern.

Another embodiment provides a computer-program product for use in conjunction with the electronic device. This computer-program product may include instructions for at least some of the aforementioned operations performed by the electronic device.

Another embodiment provides a method for facilitating access to the wireless network by the electronic device, which may be performed by the electronic device. During operation, the electronic device provides, during the time interval, information specifying the network address of the router to the authentication computer when the electronic device is connected to the network. Then, the electronic device receives, from the authentication computer, the network information, where the network information allows the electronic device to access the wireless network associated with the service provider at the remote location that is different from the home location. Moreover, the network information eliminates a need for the electronic device to provide the authentication information when accessing the wireless network.

Another embodiment provides a computer-program product for use in conjunction with the authentication computer. This computer-program product may include instructions for at least some of the aforementioned operations performed by the authentication computer.

Another embodiment provides a method for facilitating access to the wireless network by the electronic device, which may be performed by the authentication computer. During operation, the authentication computer receives, during the time interval, information specifying the network address of the router when the electronic device is connected to the network, where the electronic device uses the router to access the network, and the router is at the home location. Then, the authentication computer determines the connection pattern of the electronic device based on the received information. Moreover, the authentication computer identifies that the electronic device is at the home location based on the connection pattern. Next, the authentication computer provides, to the accounting computer, the request to allow the electronic device to access the wireless network associated with the service provider at the remote location that is different from the home location. Furthermore, the authentication computer communicates, to the electronic device, the network information, where the network information allows the electronic device to access the wireless network.

Another embodiment provides a system that includes the electronic device, the authentication computer and/or the accounting computer.

This preceding summary is provided for purposes of summarizing some exemplary embodiments to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device (such as a cellular telephone) routinely connects to a network associated with a service provider via a router at a home location. During a time interval, the electronic device provides information specifying a network address of the router to an authentication computer when the electronic device is connected to a network. The authentication computer uses the received information to determine a connection pattern of the electronic device. Moreover, the authentication computer identifies that the electronic device is at the home location based on the connection pattern. Then, the authentication computer provides, to an accounting computer associated with the service provider, a request to allow the electronic device to access a wireless network associated with the service provider at a remote location (which is other than the home location). Furthermore, the authentication computer communicates network information to the electronic device, which allows the electronic device to access the wireless network without providing authentication information.

Communication between the electronic device and the authentication computer may include wireless communication. This wireless communication may involve conveying packets that are transmitted and received by radios in the electronic device and the authentication computer in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface, such as a near-field-communication standard or specification (from the NFC Forum of Wakefield, Mass.). In addition, the communication protocol may be compatible with a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In the discussion that follows, an IEEE 802.11-compatible communication technique (such as Wi-Fi®) is used as an illustrative example of the communication, via the router, between the electronic device and the network.

Figure 1:
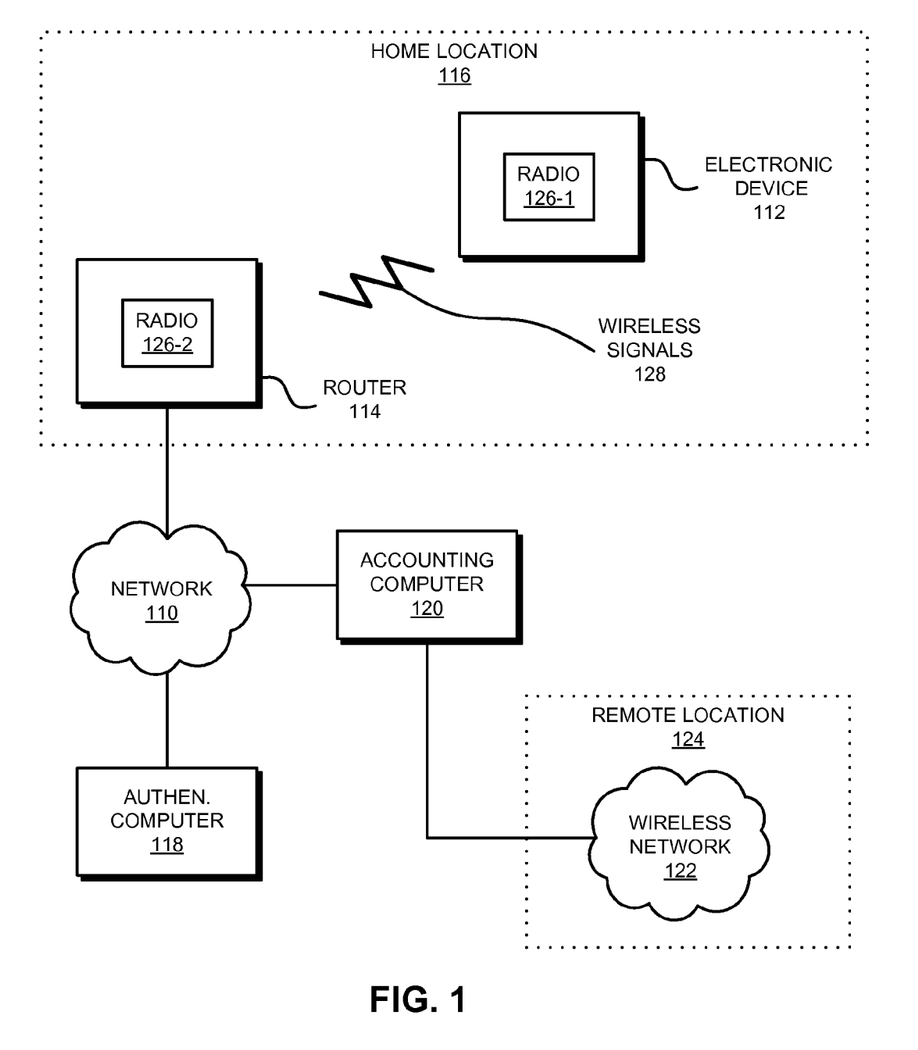
FIG. 1 is a block diagram illustrating communication in a system in accordance with an embodiment of the present disclosure.

The communication between the electronic device and the authentication computer is shown in FIG. 1, which presents a block diagram illustrating communication, via network 110 (such as one or more network-access servers), among electronic device 112 (such as a cellular telephone), router 114 at a home location 116, authentication (authen.) computer 118 and accounting computer 120. As described further below with reference to FIGS. 3-5, a service provider associated with network 110 may provide service to a user of electronic device 112. For example, the service provider may provide Internet service, via network 110, to the user when the user connects to network 110 from home location 116. In some embodiments, the connection involves wireless communication between electronic device 112 and router 114 at home location 116.

Moreover, the service provider may also offer services at other locations than home location 116. In particular, the service provider may offer access to a wireless network 122 at a remote location 124 (such as an access point at a so-called 'hot spot'), which is different than home location 116. In existing communication techniques, when electronic device 112 attempts to access wireless network 122, the user may be required to provide authentication information (such as a username, an account identifier with the service provider and/or a password). Similar information may be required the first time the user attempts to access network 110 using electronic device 112 at home location 116. However, this is typically a one-time operation. Consequently, the user may not remember the authentication information. Because the authentication information may be required each time electronic device 112 attempts to access a remote wireless network (such as wireless network 122), this approach to authentication may be cumbersome and frustrating to the user.

Instead, in the communication technique described below, electronic device 112 and/or authentication computer 118 may determine when the user is at home location 116 based on a connection pattern, such as the days, times and durations of connections to network 110 via router 114 at home location 116. For example, during a time interval (such as every couple of days over two to three weeks), electronic device 112 may provide information to authentication computer 118 whenever there is a connection to network 110 at home location 116. This information may include a network address of router 114 (such as public Internet Protocol address) or may allow authentication computer 118 to determine the network address (such as by accessing a web page, such as 'WhatIsMyIPAddress.com, and requesting and receiving the network address based on the information). Moreover, authentication computer 118 may determine the connection pattern based on the received information.

Then, authentication computer 118 may use the connection pattern to identify home location 116, i.e., authentication computer 118 may determine that electronic device 112 is at home location 116 (as opposed to another location, such as a work location). For example, when the user is at home location 116, they may connect to network 110 using electronic device 112 and router 114 at night on multiple days of the weeks, for durations longer than two hours. (However, in the communication technique authentication computer 118 may not, per se, need to determine the actual home location 116, such as the physical address. It may be sufficient for authentication computer 118 to determine when the user is at 'home.') Once home location 116 is identified, authentication computer 118 may use the network address to determine that service is provided to the user at home location 116 by the service provider. For example, authentication computer 118 may look up in a predefined list whether the network address is associated with service from the service provider. Alternatively, authentication computer 118 may ask accounting computer 120, which is associated with the service provider, if the service provider provides service to the user at home location 116 (e.g., authentication computer 118 may forward the network address to accounting computer 120 and inquire if the service provides service to this network address).

After authentication computer 118 determines or receives confirmation that the service provider provides service at home location 116, authentication computer 118 may provide a request to accounting computer 120 to allow electronic device 112 to access wireless network 122. For example, the request may include: a unique identifier of electronic device 112 (such as a media access control or MAC address), the network address and an expiration date of the access (such as two weeks later or the end of the next service billing cycle). The authentication computer 118 may optionally receive confirmation from accounting computer 120 that the request was received and that access has been enabled.

Next, authentication computer 118 communicates, via network 110 and router 114, network information to electronic device 112. This network information may allow electronic device 112 to access wireless network 122. In particular, the network information may eliminate the need for electronic device 112 to provide authentication information (such as the username, the account identifier with the service provider and/or the password associated with the account) when accessing wireless network 122.

For example, the network information may include a unique identifier of wireless network 122 (such as a Service Set Identifier or SSID). After receiving the network information, electronic device 112 may add the identifier of wireless network 122 to a list of known wireless networks. Subsequently, when electronic device 112 identifies wireless network 122, the user may not be asked to provide the authentication information (e.g., electronic device 112 may attempt to join wireless network 122 without asking the user if they want to join this wireless network). Instead, when electronic device 112 provides a connect request to wireless network 122, the identifier of electronic device 112 may be included in a header in a packet. This identifier of electronic device 112 may be forwarded to accounting computer 120. Then, accounting computer 120 may look up a record in a stored list (such as a look-up table) based on the identifier of electronic device 112, may determine that access is enabled, and thus may allow electronic device 112 to access wireless network 122.

Note that authentication computer 118 may facilitate access by additional electronic devices to wireless network 122. In particular, there may be multiple electronic devices (including electronic device 112 and the additional electronic devices) that are associated with the account with the service provider. For example, when the electronic devices are purchased, there may be a one-time registration or activation procedure with a provider of the electronic devices (which may also operate or have a third party operate authentication computer 118 on its behalf). During this registration procedure, the identifiers of the electronic devices may be provided. These electronic devices may be associated with a single account with the provider. Thus, once electronic device 112 is associated with the service provider (and, thus, the account with the service provider), the additional electronic devices that are associated with electronic device 112 in the account with the provider may also be associated with the account with the service provider. Consequently, additional requests may also be made by authentication computer 118 to accounting computer 120 to enable access to wireless network 122 by the additional electronic devices too, and authentication computer 118 may provide the network information to the additional electronic devices. (Alternatively, there may be a single request to accounting computer 120 that includes an account identifier of the account with the provider, which may allow all the electronic devices associated with this account to be enabled for access to wireless network 122.) This may allow the additional electronic devices to access wireless network 122, even though these additional electronic devices may not have connected to network 110 via router 114 at home location 116.

In some embodiments, at least some of the operations performed by authentication computer 118 in the preceding discussion are performed by electronic device 112. In particular, electronic device 112 may monitor, during the time interval, the connection pattern when electronic device 112 is connected to network 110 associated with the service provider via router 114 at home location 116. Moreover, electronic device 112 may determine that electronic device 112 is at home location 116 based on the connection pattern.

As noted previously, the communication among electronic device 112, authentication computer 118 and/or accounting computer 120 may involve the exchange of packets that include the information and/or the network information. These packets may be included in frames in one or more wireless channels.

Figure 2:
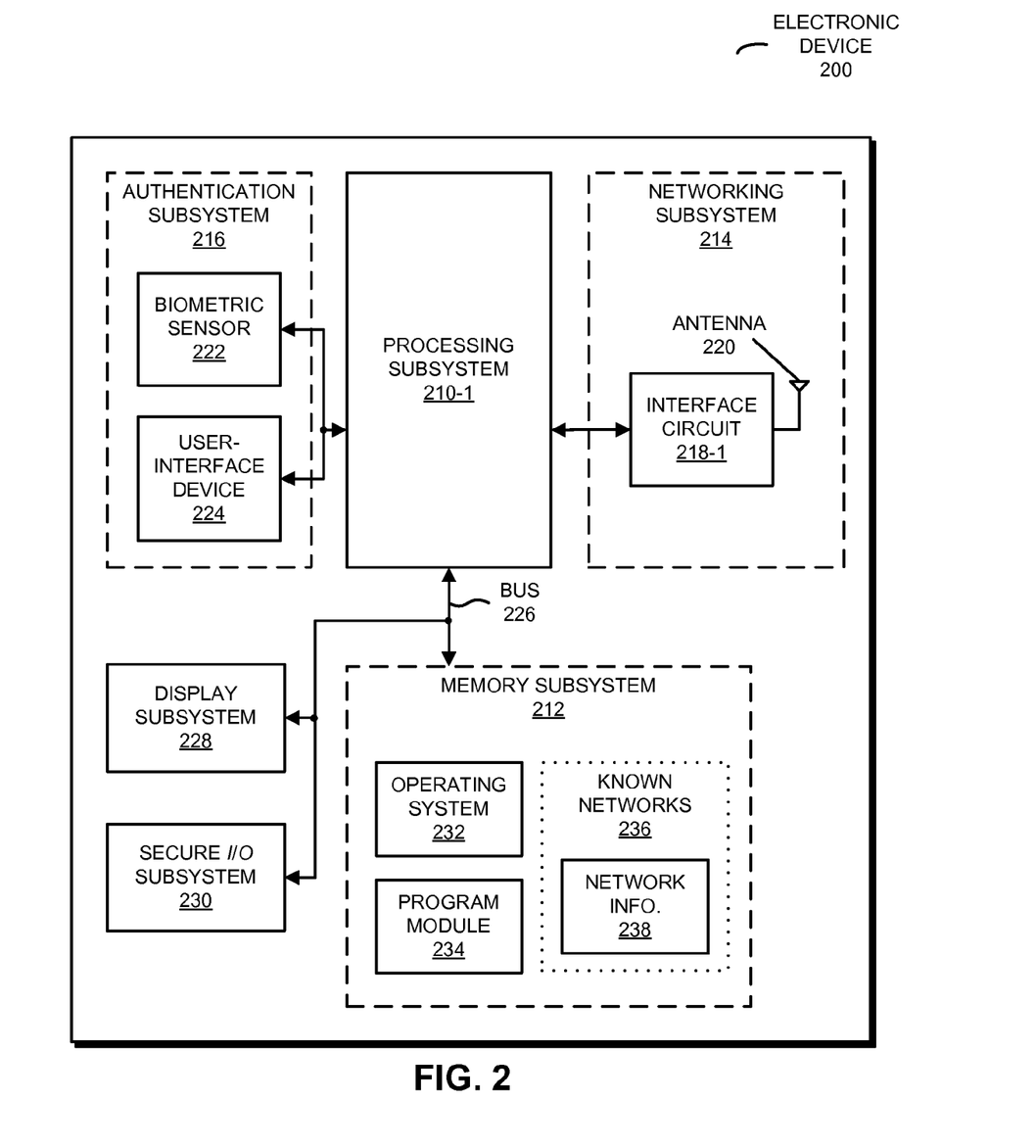
FIG. 2 is a block diagram illustrating an electronic device in the system of FIG. 1 in accordance with an embodiment of the present disclosure.

As described further below with reference to FIG. 2, electronic device 112, authentication computer 118 and/or accounting computer 120 may include subsystems, such as: a networking subsystem (which includes an interface circuit or a network interface), a memory subsystem, and a processor subsystem. In addition, electronic device 112 may include a radio 126-1 in the networking subsystems. More generally, electronic device 112 can include (or can be included within) any electronic devices with networking subsystems that enable electronic device 112 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IPSEC), transmitting and receiving packets or frames, etc.

As can be seen in FIG. 1, wireless signals 128 (represented by a jagged line) are transmitted from/received by a radio 126-1 in electronic device 112. These wireless signals are received by/transmitted from radio 126-2 in router 114. (Note that the communication among electronic device 112, authentication computer 118 and/or accounting computer 120 may also occur directly via network 110, which may involve wired communication with a different communication protocol than wireless signals 128.) Moreover, the wireless communication may or may not involve a connection being established among electronic device 112, authentication computer 118 and/or accounting computer 120, and therefore may or may not involve communication via a wireless network (such as a cellular-telephone network).

In the described embodiments, processing a packet or frame in electronic device 112 and/or router 114 includes: receiving wireless signals 128 with the packet or frame; decoding/extracting the packet or frame from received wireless signals 128 to acquire the packet or frame; and processing the packet or frame to determine information contained in the packet or frame (such as the information or the network information).

As noted previously, in general communication among electronic device 112, authentication computer 118 and/or accounting computer 120 may be encrypted. This encryption may use an encryption key (such as an encryption key associated with the provider of electronic device 112). Furthermore, the encryption may use symmetric or asymmetric encryption techniques.

Although we describe the environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the electronic device. FIG. 2 presents a block diagram illustrating electronic device 200. This electronic device includes processing subsystem 210-1, memory subsystem 212, networking subsystem 214, and authentication subsystem 216. Processing subsystem 210-1 includes one or more devices configured to perform computational operations. For example, processing subsystem 210-1 can include one or more microprocessors, application-specific integrated circuits (ASICs), microcontrollers, programmable-logic devices, and/or one or more digital signal processors (DSPs).

Memory subsystem 212 includes one or more devices for storing data and/or instructions for processing subsystem 210-1, networking subsystem 214, and/or authentication subsystem 216. For example, memory subsystem 212 can include dynamic random access memory (DRAM), static random access memory (SRAM), and/or other types of memory. In some embodiments, instructions for processing subsystem 210-1 in memory subsystem 212 include: one or more program modules or sets of instructions (such as program module 234), which may be executed by processing subsystem 210-1. Note that the one or more computer programs may constitute a computer-program mechanism or a program module. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210-1.

In addition, memory subsystem 212 can include mechanisms for controlling access to the memory. In some embodiments, memory subsystem 212 includes a memory hierarchy that comprises one or more caches coupled to a memory in electronic device 200. In some of these embodiments, one or more of the caches is located in processing subsystem 210-1.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 200 as fast-access storage for often-used data, while the mass-storage device is used to store less frequently used data.

Networking subsystem 214 includes one or more devices configured to couple to and communicate on a wired and/or wireless network (i.e., to perform network operations), including an interface circuit 218-1 and an antenna 220. For example, networking subsystem 214 can include a Bluetooth™ networking system, a cellular networking system (e.g., a 5G/4G network such as UMTS, LTE, etc.), a universal serial bus (USB) networking system, a networking system based on the standards described in IEEE 802.11 (e.g., a Wi-Fi® networking system), an Ethernet networking system, and/or another communication system (such as a near-field-communication system).

Networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 200 may use the mechanisms in networking subsystem 214 for performing simple wireless communication between electronic device 200 and router 114 (FIG. 1), e.g., transmitting advertising frames and/or near-field communication.

Authentication subsystem 216 may include one or more processors, controllers and devices for receiving the authentication information from a user of electronic device 200, and for securely communicating this authentication information to processing subsystem 210-1 (such as by encrypting the authentication information). For example, the authentication information may include: a biometric identifier acquired by a biometric sensor 222 (such as: a fingerprint sensor, a retinal sensor, a palm sensor, a digital signature-identification sensor, etc.); a personal identification number (PIN) or authentication information (such as a username, an account identifier and/or a password) associated with an account that is received using a user-interface device 224 (such as a keypad, a touch-sensitive display, optical character recognition and/or voice recognition); and a passcode for unlocking at least some functionality of electronic device 200 that is received using user-interface device 224. The authentication information may be received on a one-time basis when the user of electronic device 200 first attempts to access network 110 via router 114 at home location 116 in FIG. 1.

During operation of electronic device 200, processing subsystem 210-1 may execute program module 234 in an environment of operating system 232. When executed, program module 234 may perform at least some of the operations described below with reference to FIGS. 3 and 5. In particular, during the time interval, program module 234 may instruct interface circuit 218-1 to provide the information specifying the network address of router 114 to authentication computer 118 in FIG. 1. Then, after interface circuit 218-1 receives the network information from authentication computer 118 in FIG. 1, interface circuit 218-1 may forward the network information to processing subsystem 210-1, which may store it in a list of known networks 236 as network information 238. Subsequently, when interface circuit 218-1 receives a packet with the SSID or a network identifier of wireless network 122 (FIG. 1), and forwards it to processing subsystem 210-1, program module 234 may recognize this wireless network as a known network based on stored network information 238. Thus, instead of requesting authentication information for the user of electronic device 200, program module 234 may instruct interface circuit 218-1 to communicate a connection request to an access point associated with wireless network 122 (FIG. 1). In turn, this access point may contact accounting computer 120 (FIG. 1), which may confirm that access to wireless network 122 (FIG. 1) is enabled for electronic device 200. Consequently, electronic device 200 may be able to seamlessly start using wireless network 122 (FIG. 1).

Within electronic device 200, processing subsystem 210-1, memory subsystem 212, networking subsystem 214, and authentication subsystem 216 may be coupled using one or more interconnects, such as bus 226. These interconnects may include an electrical, optical, and/or electro-optical connection that the subsystems can use to communicate commands and data among one another. Note that different embodiments can include a different number or configuration of electrical, optical, and/or electro-optical connections among the subsystems.

In some embodiments, electronic device 200 includes display subsystem 228 for displaying information on a display (such as a notification of a successfully completed financial transaction), which may include a display driver and the display, such as a liquid-crystal display, a multi-touch touchscreen, etc. In addition, in some embodiments electronic device 200 includes a secure input/output (I/O) subsystem 230 (such as a keypad) for receiving the PIN of the user or the authentication information. As noted previously, display subsystem 228 and/or secure I/O subsystem 230 may be included in authentication subsystem 216.

Electronic device 200 can be (or can be included in) any electronic device with at least one network interface. For example, electronic device 200 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 200, in alternative embodiments, different components and/or subsystems may be present in electronic device 200. For example, electronic device 200 may include one or more additional processing subsystems, memory subsystems, networking subsystems, authentication subsystems, secure subsystems, display subsystems and/or secure I/O subsystems. Additionally, one or more of the subsystems may not be present in electronic device 200. Moreover, in some embodiments, electronic device 200 may include one or more additional subsystems that are not shown in FIG. 2. For example, electronic device 200 can include, but is not limited to, a data collection subsystem, an audio and/or video subsystem, an alarm subsystem, and/or a media processing subsystem. Also, although separate subsystems are shown in FIG. 2, in some embodiments, some or all of a given subsystem or component can be integrated into one or more of the other subsystems or components in electronic device 200. For example, in some embodiments program module 234 is included in operating system 232.

Moreover, the circuits and components in electronic device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of electronic device 200. Moreover, the integrated circuit may include hardware and/or software mechanisms that are used for transmitting wireless signals from electronic device 200 to, and receiving signals at electronic device 200 from, router 114 (FIG. 1). Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with an IEEE 802.11 standard was used as an illustrative example, the described embodiments of the communication technique may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Furthermore, while the preceding discussion focused on the hardware, software and functionality in electronic device 200, authentication computer 118 (FIG. 1) may have the same or similar hardware (processors, memory, networking interfaces, etc.) and/or software to support the operations performed by authentication computer 118 (FIG. 1), as described further below with reference to FIGS. 4 and 5. In particular, authentication computer 118 (FIG. 1) may include one or more computer systems with a processing subsystem that execute one or more program modules stored in a memory subsystem to perform the operations, and one or more networking interfaces for communicating with other electronic devices, such as electronic device 112 in FIG. 1. Thus, interface circuit 218-1 may receive, during the time interval, information specifying the network address of the router from electronic device 112 (FIG. 1). This information may be forwarded to processing subsystem 210-1. If this information does not include the network address, program module 234 (when executed by processing subsystem 210-1) may use this information to determine the network address of the router. For example, program module 234 may instruct interface circuit 218-1 to forward a request to a website, such as WhatIsMyIPAddress.com, which returns the network address to interface circuit 218-1, then to processing subsystem 210-1. Moreover, program module 234 may determine the connection pattern of electronic device 112 (FIG. 1) based on the received information, and identifies that electronic device 112 (FIG. 1) is at the home location based on the connection pattern. Next, program module 234 may instruct interface circuit 218-1 to provide accounting computer 120 (FIG. 1) the request to allow electronic device 112 (FIG. 1) to access the wireless network associated with the service provider. In addition, program module 234 may instruct interface circuit 218-1 to provide the network information to electronic device 112 (FIG. 1).

Figure 3:
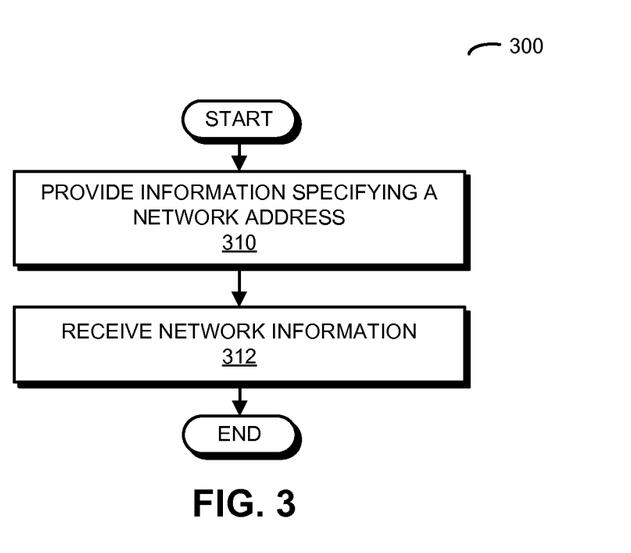
FIG. 3 is a flow diagram illustrating a method for facilitating access to a wireless network by an electronic device in the system of FIG. 1 in accordance with an embodiment of the present disclosure.

We now further describe embodiments of the method. FIG. 3 presents a flow diagram illustrating a method 300 for facilitating access to a wireless network by an electronic device (such as electronic device 112 in FIG. 1), which may be performed by a processor in the electronic device. For example, the processor may execute a program module that includes instructions for operations in method 300. During operation, the electronic device provides, during the time interval, information specifying the network address (operation 310) of the router to the authentication computer when the electronic device is connected to the network. For example, the electronic device may provide the information multiple times during the time interval, such as whenever the electronic device is connected to the network. Then, after the authentication computer performs the operations in method 400 (FIG. 4), the electronic device receives, from the authentication computer, the network information (operation 312), where the network information allows the electronic device to access the wireless network associated with the service provider at the remote location that is different from the home location. Moreover, the network information eliminates a need for the electronic device to provide the authentication information when accessing the wireless network.

Figure 4:
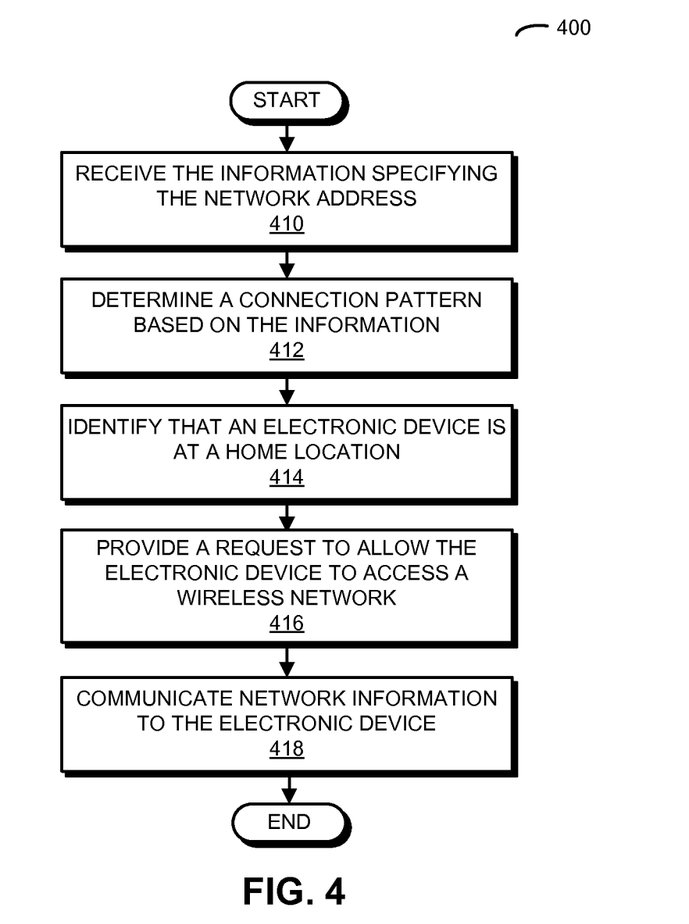
FIG. 4 is a flow diagram illustrating a method for facilitating access to a wireless network by an electronic device in the system of FIG. 1 in accordance with an embodiment of the present disclosure.

FIG. 4 presents a flow diagram illustrating a method 400 for facilitating access to the wireless network by the electronic device (such as electronic device 112 in FIG. 1), which may be performed by a processor in the authentication computer. For example, the processor may execute a program module that includes instructions for operations in method 400. During operation, the authentication computer receives, during the time interval, information specifying the network address (operation 410) of the router when the electronic device is connected to the network, where the electronic device uses the router to access the network, and the router is at the home location. Then, the authentication computer determines the connection pattern of the electronic device (operation 412) based on the received information. Moreover, the authentication computer identifies that the electronic device is at the home location (operation 414) based on the connection pattern. Next, the authentication computer provides, to the accounting computer, the request to allow the electronic device to access the wireless network (operation 416) associated with the service provider at the remote location that is different from the home location. Furthermore, the authentication computer communicates, to the electronic device, the network information (operation 418), where the network information allows the electronic device to access the wireless network.

In some embodiments of methods 300 (FIG. 3) and/or 400 (FIG. 4), there may be additional or fewer operations.

Furthermore, the order of the operations may be changed, and/or two or more operations may be combined into a single operation.

In an exemplary embodiment, the communication technique is used to identify a user's service provider by determining the user's home location based on their connection pattern at the home location and the network address (and, in particular, the external Internet Protocol or IP address) used for accessing a network (such as the Internet) from the home location. Internet service providers have blocks of IP addresses assigned to them. When the user's electronic device provides the information specifying the IP address to the authentication computer, the authentication computer may contact the accounting computer to determine the service provider associated with the IP address. Alternatively, the authentication computer may use the IP address to look up the service provider.

Then, the home location may be determined by collecting and analyzing usage patterns, i.e., the connection pattern. The connection pattern may include: how long the electronic device stays at the same geographic location, how long the electronic device is stationary, when the electronic device is charged, when the electronic device has continuous Wi-Fi® access, the time of day (day vs. night), etc. In general, the home location cannot be determined instantaneously. Instead, some learning time (such as two to three weeks) may be needed. Note that in the communication technique the physical or geographic home location may not need to be determined. Instead, the association between the IP address and the connection pattern may be used to identify when the electronic device is at the home location, and thus to determine who the service provider for the user is at the home location.

The architecture of a system implementing the communication technique may include: a network-access server, an authentication computer and an accounting computer. The network-access server may redirect authentication communication from the electronic device to the authentication computer. For example, during an initial set up of an application on the electronic device, user and root certificates that are used for an extensible-authentication-protocol transportation-layer-security (EAP-TLS) authentication may be created. When authentication is completed, the network-access server may also redirect accounting requests to the accounting computer, which may be part of the service provider's infrastructure.

Figure 5:
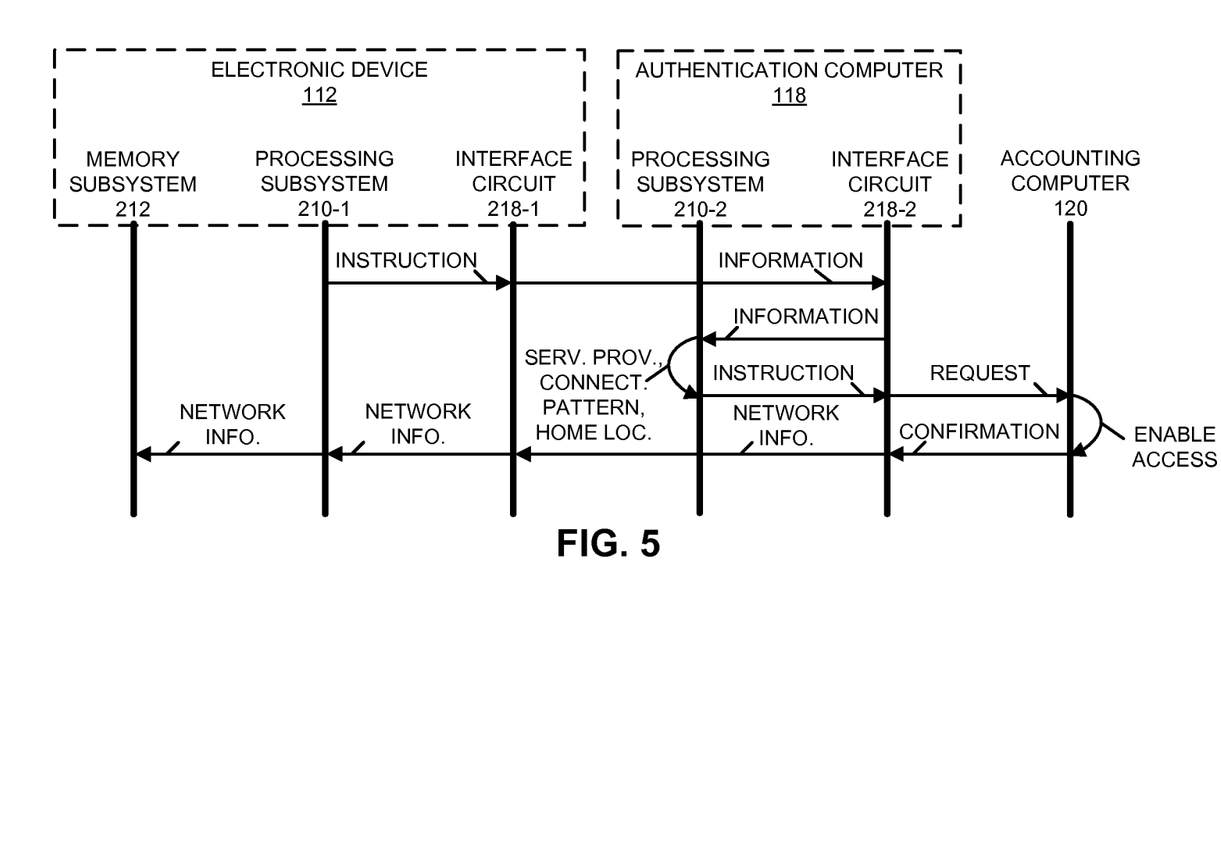
FIG. 5 is a drawing illustrating communication in the electronic device and the system of in FIG. 1 in accordance with an embodiment of the present disclosure.

The communication within electronic device 112 and with authentication computer 118 and accounting computer 120 during methods 300 and 400 is shown in FIG. 5. In particular, during the time interval, processing subsystem 210-1 (which executes a program module) in electronic device 112 may instruct interface circuit 218-1 to provide the information specifying the network address of router 114 (FIG. 1) to authentication computer 118. Then, interface circuit 218-2 in authentication computer 118 may receive the information, which is forwarded to processing subsystem 210-2 (which executes another program module). Moreover, processing subsystem 210-2 may: look up the service provider, determine the connection pattern of electronic device 112 (FIG. 1) based on the received information, and identify that electronic device 112 (FIG. 1) is at the home location based on the connection pattern. Next, processing subsystem 210-2 may instruct interface circuit 218-2 to provide accounting computer 120 the request to allow electronic device 112 to access the wireless network associated with the service provider. In response, accounting computer 120 enables the access. In addition, processing subsystem 210-2 instructs interface circuit 218-2 to provide the network information to electronic device 112. After interface circuit 218-1 receives the network information, interface circuit 218-1 may forward the network information to processing subsystem 210-1, which may store it in a list of known networks in memory subsystem 212.

Figure 6:
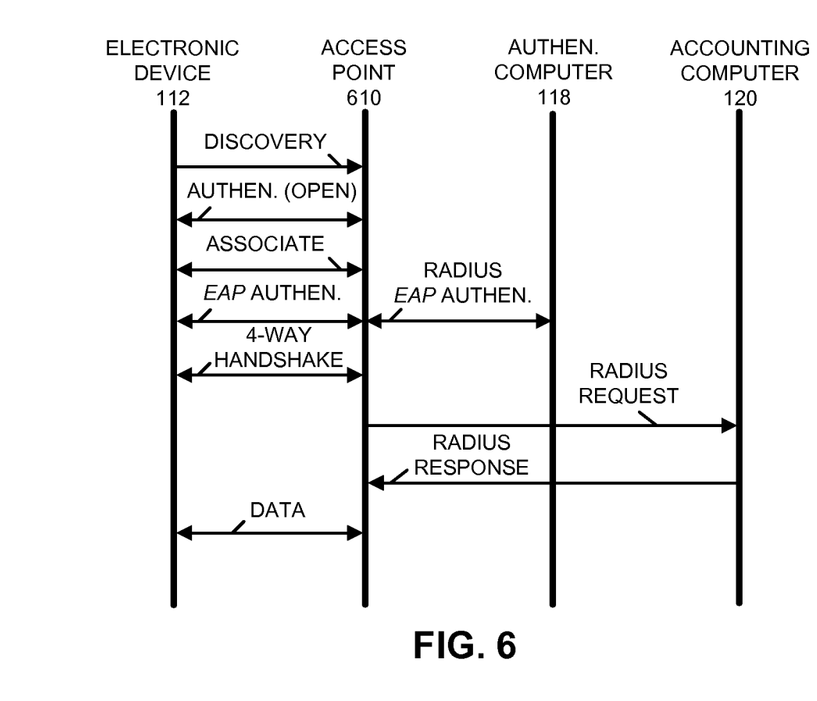
FIG. 6 is a drawing illustrating establishing a connection between the electronic device and the wireless network in FIG. 1 in accordance with an embodiment of the present disclosure.

In some embodiments, the electronic device uses Hotspot 2.0 (from the Wi-Fi® Alliance of Austin, Tex.), which is sometimes referred to as 'HS2' or 'Wi-Fi® CERTIFIED Passpoint™,' to identify a hotspot or wireless network operated by the service provider (or an affiliated partner) at the remote location. As shown in FIG. 6, which presents a drawing illustrating establishing a connection between the electronic device and the wireless network, when the hotspot identifies the electronic device, EAP-TLS may be used for enterprise-level authentication and data encryption against the authentication computer or the accounting computer. This may allow the electronic device to automatically join the hotspot without requiring user action.

In particular, electronic device 112 and access point 610 may exchange packets during discovery, IEEE 802.11 authentication (open), IEEE 802.11 association, EAP authentication, and a four-way handshake. Moreover, access point 610 and authentication computer 118 may exchange one or more packets during radius EAP authentication, and there may be a radius EAP-accounting request and a radius EAP-accounting response between access point 610 and accounting computer 120. Then, data can be exchanged in packets between electronic device 112 and access point 610, i.e., the connection may be established without requiring action by the user of electronic device 112.

Note that the service provider may keep track of the user's data usage. When a free-data usage limit is reached, the accounting computer may not permit Internet or wireless-network access. Instead, user requests may be redirected to a captive portal. However, if the user has not reached the free-data usage limit or has been identified as a customer of the service provider who is eligible for unlimited access using the communication technique, the accounting computer may instruct the network-access server to allow Internet (and, more generally, wireless network) access. Alternatively, if the user was not identified as a customer of the service provider, a dialog box or window may be displayed on the electronic device indicating that the free-data usage limit has expired. The user may be given the option to: sign in using authentication information or account credentials (such as a username, account identifier and/or password), disconnect from the wireless network, or learn more about the service provider's offering (which may allow the user to subscribe from the electronic device). Note that if the user chooses 'disconnect,' the electronic device may not try to auto-joint the service provider's or a partner's wireless network until a subsequent free-usage period starts.

Additionally, in some embodiments the electronic device collects link-quality metrics, which may be reported to the authentication computer or another computer operated by or on behalf of the provider of the electronic device. For example, before connecting to the hotspot, the electronic device may verify and report that there is sufficient bandwidth available by requesting Hotspot wireless-area-network (WAN) metrics as defined in the Hotspot 2.0 standard. This reporting may allow locations where more access points are needed to provide a good user experience.

While the preceding discussion of the communication technique used identification of an existing customer of the service provider based on their connection pattern to facilitate seamless access to a wireless network, in other embodiments the connection pattern may be used to identify prospective customers for the service provider or another entity (i.e., to identify individuals who are not currently customers of the service provider or the other entity). Furthermore, in some embodiments the home location of the user of the electronic device is identified based on the environment (such as the presence of one or more wireless networks). This approach may be used in addition to or independently of determining the connection pattern.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a processor; and
   memory coupled to the processor and configured to store a program module to be executed by the processor, the program module comprising:
      instructions for communicating with a network associated with a service provider;
      instructions for transmitting information specifying a network address of a router at a home location to an authentication computer;
      instructions for monitoring usage information over time to compile a connection pattern in response to the electronic device being connected to the network associated with the service provider via the router at the home location;
      instructions for determining that the electronic device is at the home location based at least in part on the connection pattern;
      instructions for receiving, from the authentication computer, first network information, wherein the first network information allows the electronic device to access a wireless network associated with the service provider at a remote location that is different from the home location;
      instructions for receiving, from the wireless network, a packet comprising second network information;
      instructions for transmitting a connection request to the wireless network associated with the service provider at the remote location based at least in part on the first network information matching the second network information; and
      instructions for establishing a connection with the wireless network associated with the service provider at the remote location after transmitting the connection request to the wireless network.

2. The electronic device of claim 1, wherein the authentication computer is configured to determine the network address based at least in part on the information.

3. The electronic device of claim 1, wherein the first network information comprises a unique identifier of the wireless network; and
   wherein, after the instructions for receiving the first network information, the program module comprises instructions for adding the unique identifier to a list of known wireless networks.

4. The electronic device of claim 1, wherein the program module further comprises:
   instructions for requesting authentication information in response to the service provider not being associated with the network address of the router at the home location, wherein the authentication information comprises a password associated with an account of the service provider.

5. The electronic device of claim 1, wherein the instructions for transmitting the information specifying the network address occurs during a defined time interval.

6. A computer-program product for use in conjunction with an electronic device, the computer-program product comprising a non-transitory computer-readable storage medium and a computer-program mechanism embedded therein, to facilitate access to a wireless network by the electronic device, the computer-program mechanism comprising:
   instructions for monitoring usage information over time to compile a connection pattern in response to the electronic device being connected to a network associated with a service provider via a router at a home location;
   instructions for determining that the electronic device is at the home location based at least in part on the connection pattern;
   instructions for transmitting information specifying a network address of the router at the home location to an authentication computer at a remote location;
   instructions for receiving, from the authentication computer, first network information, wherein the first network information allows the electronic device to access the wireless network associated with the service provider at the remote location that is different from the home location;
   instructions for receiving, from the wireless network, a packet comprising second network information;
   instructions for transmitting a connection request to the wireless network associated with the service provider at the remote location based at least in part on the first network information matching the second network information; and
   instructions for establishing a connection with the wireless network associated with the service provider at the remote location after transmitting the connection request to the wireless network.

7. The computer-program product of claim 6, wherein the first network information comprises a unique identifier of the wireless network; and
   wherein, after the instructions for receiving the first network information, the computer-program mechanism comprises instructions for adding the unique identifier to a list of known wireless networks.

8. The computer-program product of claim 6, further comprising:
   instructions for requesting authentication information in response to the service provider determining not being associated with the network address of the router at the home location, wherein authentication information comprises a password associated with an account of the service provider.

9. An authentication computer, comprising:
a network interface configured to communicate, via a network, with an accounting computer associated with a service provider of the network, and configured to communicate, via the network and a router at a home location, with an electronic device; and
a processor coupled to the network interface and configured to:
receive, during a time interval, information specifying a network address of the router in response to the electronic device being connected to the network;
determine a connection pattern of the electronic device based at least in part on the received information;
determine that the electronic device is at the home location based at least in part on the connection pattern;
determine that a location is the home location based at least in part on the connection pattern;
transmit, to the accounting computer, a request to allow the electronic device to access a wireless network associated with the service provider at a remote location that is different from the home location;
receive, from the accounting computer, network information in response to the request; and
communicate, to the electronic device, the network information, wherein the network information is configured to allow the electronic device to establish a connection with and access the wireless network in response to the network information matching another network information received from the wireless network.

10. The authentication computer of claim 9, wherein the information comprises the network address.

11. The authentication computer of claim 9, wherein the processor is further configured to:
request the network address based at least in part on the information; and
receive the network address.

12. The authentication computer of claim 9, wherein the connection pattern comprises:
days and times that the electronic device is connected to the network, and
durations of the connections to the network associated with the days and times.

13. The authentication computer of claim 9, wherein the request comprises a unique identifier of the electronic device, the network address, and an expiration date of the access to the wireless network.

14. The authentication computer of claim 9, wherein, the processor is further configured to determine the service provider is associated with the network address of the router at the home location.

15. The authentication computer of claim 9, wherein the network information comprises a unique identifier of the wireless network.

16. The authentication computer of claim 9, wherein the electronic device is associated with an account of the service provider; and
wherein the program module comprises instructions for providing the authentication information to additional electronic devices associated with the account.

17. A computer-program product for use in conjunction with an authentication computer, the computer-program product comprising a non-transitory computer-readable storage medium and a computer-program mechanism embedded therein, to facilitate access to a wireless network by an electronic device, the computer-program mechanism including:
instructions for receiving information specifying a network address of a router location used by the electronic device to connect to a network associated with a service provider;
instructions for compiling a connection pattern over time based at least in part on the received information;
instructions for determining that the router location is a home location based at least in part on the connection pattern;
instructions for transmitting, to an accounting computer, a request to allow the electronic device access to the wireless network associated with the service provider at a remote location that is different from the home location;
receiving, from the accounting computer, network information in response to the request, wherein the network information allows the electronic device to access the wireless network at the remote location; and
instructions for communicating, to the electronic device, the network information, wherein the network information is configured to allow the electronic device to establish a connection with and access the wireless network in response to the network information matching another network information received from the wireless network.

18. The computer-program product of claim 17, wherein the electronic device is associated with an account of the service provider; and
wherein the computer-program mechanism comprises instructions for providing the authentication information to additional electronic devices associated with the account.

19. A computer-implemented method for facilitating access to a wireless network by an electronic device, wherein the method comprises:
receiving, during a time interval, information specifying a network address of a router in response to the electronic device being connected to a network, wherein the electronic device is configured to use the router to access the network, and wherein the router is at a home location;
collecting usage information over time to compile a connection pattern of the electronic device based at least in part on the received information;
determining that a location is the home location based at least in part on the connection pattern;
transmitting, to an accounting computer, a request to allow the electronic device access to the wireless network associated with a service provider at a remote location that is different from the home location;
receiving, from the accounting computer, network information in response to the request, wherein the network information allows the electronic device to access the wireless network at the remote location; and
communicating, to the electronic device, the network information, wherein the network information is configured to allow the electronic device to establish a connection with and access the wireless network in response to the network information matching another network information received from the wireless network.

20. The method of claim 19, wherein the communicating comprises eliminating a need for the electronic device to provide authentication information to access the wireless network.

* * * * *